(12) United States Patent
Nakagawa (10) Patent No.: US 12,430,739 B2
(45) Date of Patent: Sep. 30, 2025

(54) TRAINING DATA GENERATION DEVICE, INSPECTION DEVICE AND PROGRAM

(71) Applicant: System Square Inc., Nagaoka (JP)

(72) Inventor: Sachihiro Nakagawa, Nagaoka (JP)

(73) Assignee: SYSTEM SQUARE INC., Niigata (JP)

( * ) Notice: Subject to any disclaimer, the term of this patent is extended or adjusted under 35 U.S.C. 154(b) by 541 days.

(21) Appl. No.: 17/631,423

(22) PCT Filed: Mar. 24, 2021

(86) PCT No.: PCT/JP2021/012284
§ 371 (c)(1),
(2) Date: Jan. 28, 2022

(87) PCT Pub. No.: WO2021/193733
PCT Pub. Date: Sep. 30, 2021

(65) Prior Publication Data
US 2022/0318985 A1    Oct. 6, 2022

(30) Foreign Application Priority Data

Mar. 24, 2020   (JP) .................................. 2020-053241

(51) Int. Cl.
*G06T 7/00* (2017.01)
*G01N 23/04* (2018.01)

(52) U.S. Cl.
CPC .......... *G06T 7/0004* (2013.01); *G01N 23/04* (2013.01); *G01N 2223/401* (2013.01);
(Continued)

(58) Field of Classification Search
None
See application file for complete search history.

(56) References Cited

U.S. PATENT DOCUMENTS

2004/0086162 A1*  5/2004  Doi ....................... G06T 7/0012
                                                          382/190
2012/0327227 A1* 12/2012  Ikeda ................... G01N 21/958
                                                          348/143
(Continued)

FOREIGN PATENT DOCUMENTS

| JP | 201189920 A | 5/2011 |
| WO | 2016152485 A1 | 9/2016 |
| WO | 2019059011 A1 | 3/2019 |

OTHER PUBLICATIONS

Partial Supplementary European Search Report in EP application No. 21776862.1, dated Mar. 26, 2024, 11pp.
(Continued)

*Primary Examiner* — Vikkram Bali
(74) *Attorney, Agent, or Firm* — HAUPTMAN HAM, LLP (57) ABSTRACT

A training data generation device includes: cut-out unit that receives an input of an image of an inspection target, specifies an inspection area of the inspection target in the image by a predetermined method, and cuts out the specified inspection area from the image; sorting unit that, on the basis of a sorting operation of sorting, as a learning-target image, an image of the inspection area cut out in the cut-out unit into at least either normal or non-normal, associates the learning-target image and a result of the sorting with each other; and training data memory unit that stores training data in which the learning-target image and the result of the sorting are associated with each other.

5 Claims, 9 Drawing Sheets (52) U.S. Cl.
CPC ............. *G01N 2223/643* (2013.01); *G06T 2207/10116* (2013.01); *G06T 2207/20081* (2013.01)

(56) References Cited

U.S. PATENT DOCUMENTS

| | | | |
|---|---|---|---|
| 2018/0107928 A1* | 4/2018 | Zhang | G06N 3/082 |
| 2020/0125923 A1* | 4/2020 | Jones | G06V 20/48 |
| 2020/0219248 A1 | 7/2020 | Kaneko | |
| 2023/0109179 A1* | 4/2023 | Bhatt | G06N 3/045 |
| | | | 382/152 |

OTHER PUBLICATIONS

European Search Report in EU application No. 21776862.1, dated Jul. 11, 2024, 13pp.
Office Action in CN application No. 202180004905.4, dated Mar. 3, 2025, 31pp.

* cited by examiner

TRAINING DATA GENERATION DEVICE, INSPECTION DEVICE AND PROGRAM

RELATED APPLICATIONS

The present application is a National Phase of International Application Number PCT/JP2021/012284, filed Mar. 24, 2021, and claims priority based on Japanese Patent Application No. 2020-053241, filed Mar. 24, 2022.

FIELD OF THE INVENTION

The present invention relates to training data generation devices, inspection devices, and programs for performing inspection, in the inspection devices for inspecting objects-to-be-inspected on the basis of images capturing the objects-to-be-inspected, by generating training data which is made available for machine learning in order to generate a learned model for determining non-defective and/or defective status of the inspection targets.

BACKGROUND ART

An X-ray inspection device includes an X-ray generation unit and an X-ray detection unit that are arranged facing each other. Objects-to-be-inspected are sequentially fed through between these units by a feeding device such as a conveyor. X-ray transmission data is obtained when the objects-to-be-inspected pass through between the X-ray generation unit and the X-ray detection unit. By using the X-ray transmission data, the X-ray inspection device generates an X-ray transmission image of the objects-to-be-inspected and performs a non-destructive inspection on the objects-to-be-inspected using such X-ray transmission image. Examples of the applications thereof include inspection for checking whether the contents of packaged products are contaminated with foreign matter, inspection for checking whether the contents are equipped with a predetermined number of pieces, inspection for checking whether defects, such as cracks, exist in the contents, and other such inspections. These inspections are performed on various items including foodstuffs, pharmaceuticals, industrial components, and the like. In addition to X-ray inspection devices, other inspection devices have also been put to practical use for inspecting objects-to-be-inspected on the basis of images capturing the objects-to-be-inspected.

In this type of inspection device, the objects-to-be-inspected are sorted into non-defective items and defective items based on predetermined determination criteria. These criteria have conventionally been pre-defined; however, owing to the current development of machine learning technology, the use of learned models as the determination criteria has been proposed. The learned models are generated by inputting learning data (training data) into learning programs (see, for example, Patent Document 1).

PRIOR ART DOCUMENTS

Patent Documents

Patent Document 1: Japanese Patent Application No. 2011-089920

SUMMARY OF THE INVENTION

Problems to be Solved by the Invention

Although it is possible to use learned models as the determination criteria when determining non-defective and/or defective status in inspection for biting, and the like, at sealing sections of packaged bags, an efficient method for collecting learning data to be input into learning programs for generating the learned models has not yet been established.

The present invention has been made in view of the above-described problem, and an object of the present invention is to provide a training data generation device, an inspection device, and a program, which are enabled to perform inspection by efficiently generating training data for generating a learned model to be used for determining non-defective and/or defective status in inspection for biting and the like.

Means for Solving the Problem

The training data generation device of the present invention generates training data to be used in machine learning. A learned model generated by the machine learning using the training data generated by the training data generation device is used in an inspection device that performs inspection for determining whether an inspection target is normal on the basis of a determination result, which is output by inputting a determination-target image cut out from the image of the inspection target into the learned model. The training data generation device includes the following: a cut-out means that receives an input of the image of the inspection target, specifies an inspection area of the inspection target in the image by a predetermined method, and cuts out the specified inspection area from the image; a sorting means that, on the basis of a sorting operation of sorting, as a learning-target image, an image of the inspection area cut out in the cut-out means into at least either normal or non-normal, associates the learning-target image and a result of the sorting with each other; and a training data memory means that stores training data in which the learning-target image and the result of the sorting are associated with each other.

In the training data generation device of the present invention, the inspection area may be specified on the basis of positional information of one or more input reference points and information indicating distance from the reference point(s).

In addition, the inspection area may be specified on the basis of a blob detected from a binarized image, the binarized image being obtained by binarizing the image on the basis of a predetermined threshold of brightness/darkness of the image.

The training data generation device of the present invention may further includes an extraction means that extracts a smaller sub-image from the image of the inspection area cut out in the cut-out means, and the sorting means, on the basis of a sorting operation of sorting, as a learning-target image, the sub-image into at least either normal or non-normal, may associate the sub-image and a result of the sorting with each other.

In the training data generation device of the present invention, the extraction means may extract a plurality of the sub-images such that a partial overlap with a neighboring sub-image is present.

The training data generation device of the present invention may further includes the following: a display and a display control means that controls display by the display. The display control means may cause a first region of the display to display a plurality of the learning-target images side-by-side and may cause a second region of the display to display the image of the inspection target with an indication indicating a region corresponding to the learning-target image being superimposed on the image of the inspection target.

In the training data generation device of the present invention, when one of the plurality of learning-target images displayed in the first region of the display is selected, the display control means may cause an indication indicating a region corresponding to the selected learning-target image to be displayed in the image of the inspection target displayed in the second region of the display.

The inspection device of the present invention includes the following: a conveyance unit that feeds an inspection target and causes the inspection target to pass through an inspection region; an electromagnetic-wave radiation unit that applies electromagnetic waves to the inspection region; an electromagnetic-wave detection unit arranged at a position facing the electromagnetic-wave radiation unit across the conveyance unit and detects electromagnetic waves that have transmitted through the inspection target passing through the inspection region; an image construction means that configures, as a two-dimensional image, an intensity distribution of the electromagnetic waves detected by the electromagnetic-wave detection unit; a cut-out means that specifies an inspection area of the inspection target in the image of the inspection target configured in the image construction means by a predetermined method and that cuts out the specified inspection area from the image; and a determination means that performs inspection for determining whether the inspection target is normal on the basis of a determination result that is output by inputting, as a determination-target image, the image of the inspection area cut out in the cut-out means into a learned model.

In the inspection device of the present invention, the inspection area may be specified on the basis of positional information of one or more input reference points and information indicating distance from the reference point(s).

In addition, the inspection area may be specified on the basis of a blob detected from a binarized image, the binarized image being obtained by binarizing the image on the basis of a predetermined threshold of brightness/darkness of the image.

The inspection device of present invention may further include an extraction means that extracts a smaller sub-image from the image of the inspection area cut out in the cut-out means, and the determination means may perform inspection of the inspection target by inputting, as a determination-target image, the sub-image into the learned model.

In the inspection device of the present invention, the extraction means may extract a plurality of the sub-images such that a partial overlap with a neighboring sub-image is present.

In the inspection device of the present invention, the determination result output by the learned model may be a score that indicates normality of the input determination-target image, and the determination means may perform inspection for determining whether the inspection target is normal on the basis of the score.

In the inspection device of the present invention, a plurality of the determination-target images may be provided, and the determination means may perform inspection for determining whether the inspection target is normal on the basis of the score output for the each of the determination-target images by inputting each of the determination-target images into the learned model.

The respective means configuring the training data generation device and the inspection device of the present invention may be implemented by causing a computer to execute a program in which the functions of the respective means are described.

Effect of the Invention

The training data generation device, the inspection device and the program of the present invention are enabled to perform inspection by efficiently generating training data for generating a learned model to be used for determining non-defective and/or defective status in inspection for biting and the like.

EMBODIMENTS OF THE INVENTION

Embodiments of the present invention will be described hereinafter with reference to the drawings. Identical members will be denoted by the same reference numbers and the description of already-described members will be omitted as necessary in the following description.

Configuration of Inspection Device 1

Figure 1:
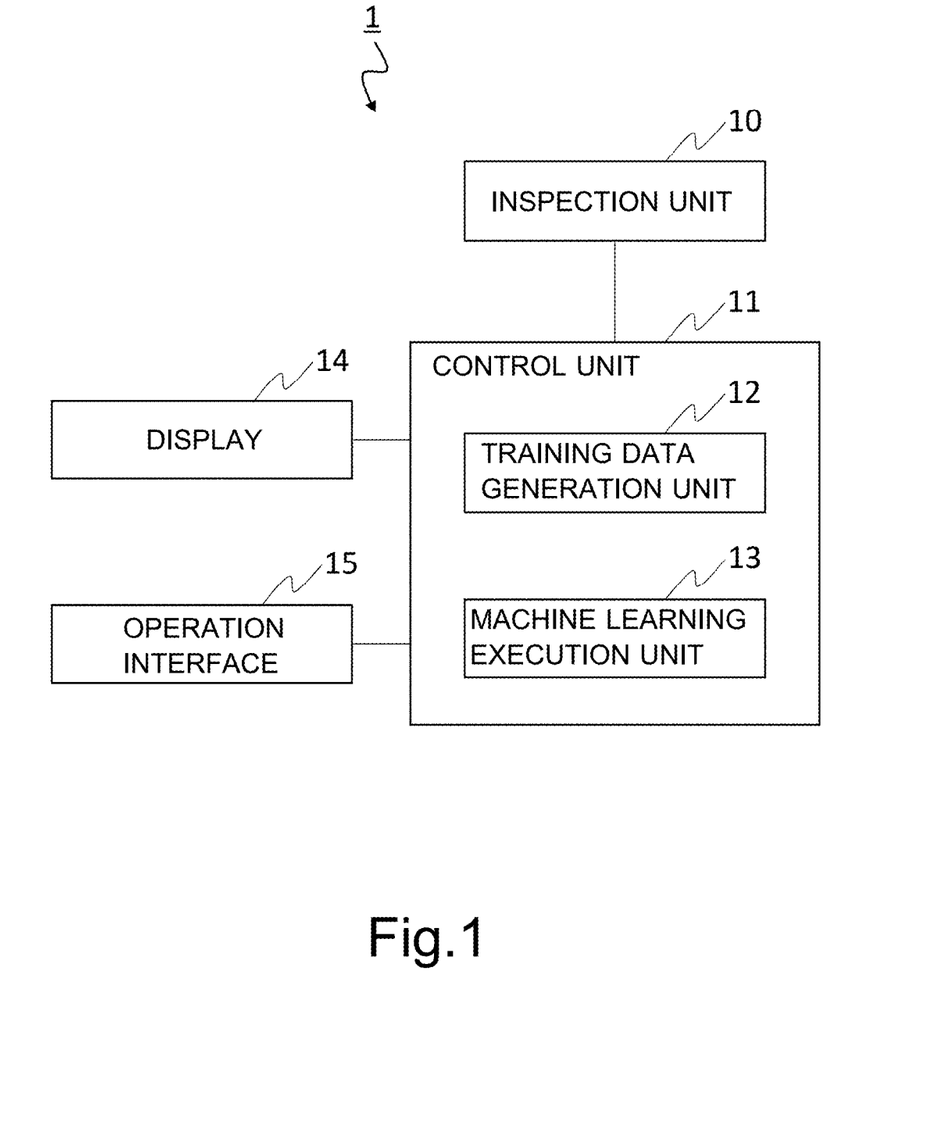
FIG. 1 is a block diagram showing a configuration of an inspection device 1.

FIG. 1 is a block diagram showing a configuration of the inspection device 1 that inspects whether an inspection target is normal. The inspection device 1 includes an inspection unit 10, a control unit 11, a display 14 and an operation interface 15. When the inspection target to be inspected by the inspection device 1 is a package with a seal section, the inspection area is, for example, the seal section. In this case, the inspection area not being normal refers to a sealing state in which there is a risk of airtightness inside the package and/or the quality of the product being compromised due to biting of the contents, wrinkles, folds, or the like, at the seal section. The inspection area being normal refers to a state in which no such problem is present.

The inspection device 1 has an inspection mode and a learning mode. In the inspection mode, a determination-target image is cut out from an image of the inspection target captured by the inspection unit 10. The determination-target image is input into a learned model generated in a machine learning execution unit 13 and the like to inspect, through image analysis, for the presence/absence of biting of the contents and wrinkles, folds, or the like, of the seal in the inspection target. On the other hand, in the learning mode, training data is generated by a training data generation unit 12 on the basis of the images of the inspection target captured by the inspection unit 10, or the like. The training data is input into the machine learning execution unit 13 to cause the learned model to learn.

The inspection unit 10 captures an image of the inspection target to be provided for inspection. An example of the inspection unit 10 is an X-ray inspection device for capturing an X-ray transmission image of the inspection target; however, the inspection unit 10 is not limited thereto, as long as it is an inspection device that performs inspection on the basis of the image of the inspection target. In the inspection mode, the inspection unit 10 cuts out an image of the inspection area and/or a sub-image from the captured image of the inspection target and inputs such image of the inspection area and/or the sub-image image into the learned model, which is previously generated in the machine learning execution unit 13, in order to perform inspection on the inspection target. In addition, in the learning mode, the inspection unit 10 provides the captured image of the inspection target to the training data generation unit 12 as an input image.

Figure 2:
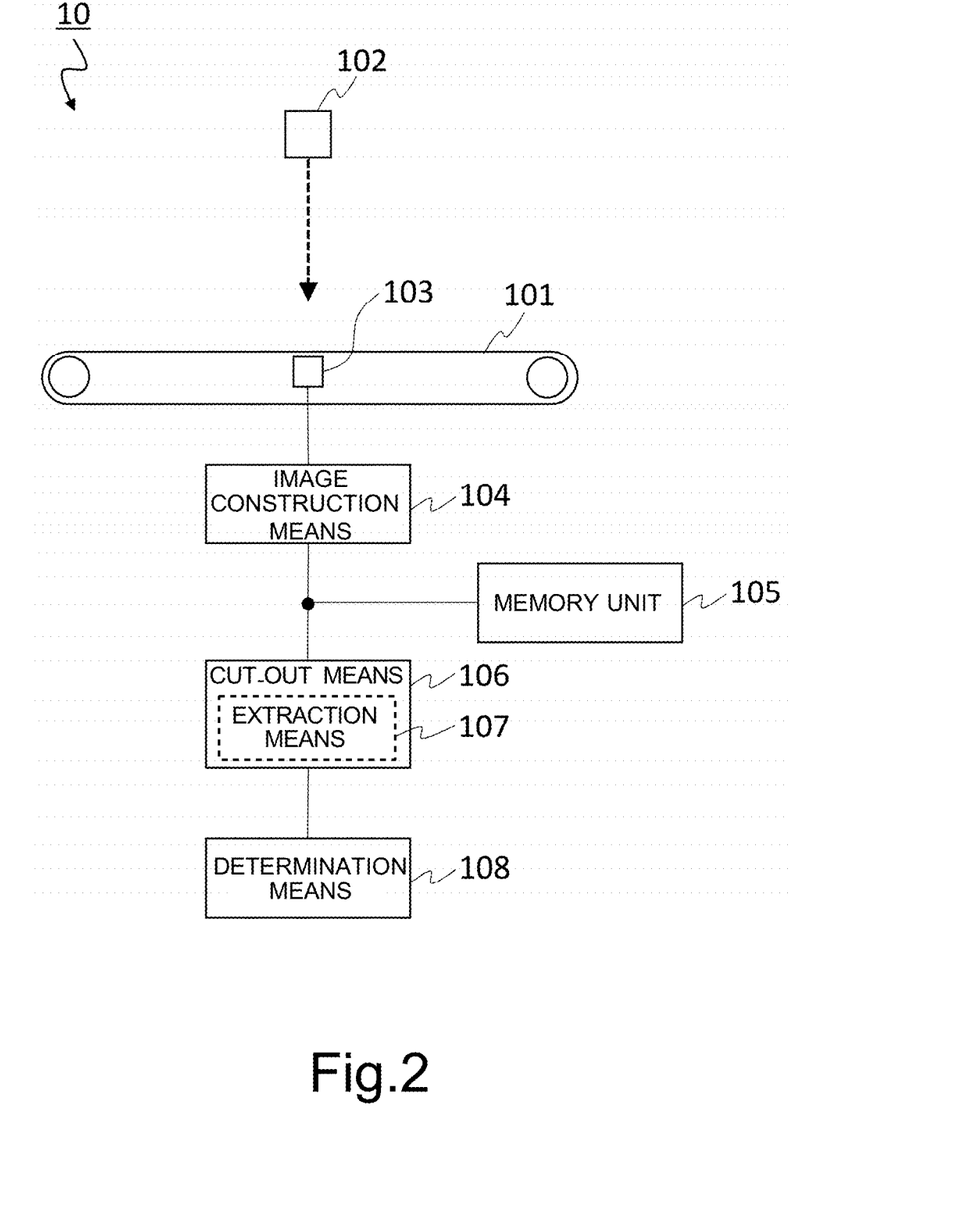
FIG. 2 is a diagram showing one example of the configuration of an inspection unit 10.

FIG. 2 shows one example of the configuration of the inspection unit 10. In this example, an X-ray transmission image is acquired as an image to be provided for inspection. The X-ray transmission image is obtained by applying an X-ray, as an electromagnetic wave, to the inspection target. The inspection unit 10 includes a conveyance unit 101, an electromagnetic-wave radiation unit 102, an electromagnetic-wave detection unit 103, an image construction means 104, a memory unit 105, a cut-out means 106, and a determination means 108.

The conveyance unit 101 is made up of one or more conveyor belts and feeds an inspection target to an inspection region, where images are taken, and feeds out the inspection target from the inspection region after the image is taken.

The electromagnetic-wave radiation unit 102 applies electromagnetic waves (for example, X-rays, ultraviolet light, visible light, infrared light, etc.) to the inspection region for taking the images. The electromagnetic-wave radiation unit 102 is arranged such that, for example, the electromagnetic waves are applied perpendicularly to a conveyance surface carrying the inspection target thereon in the conveyance unit 101. The inspection region is covered with a shielding cover, if necessary, in order to prevent the electromagnetic waves applied from the electromagnetic-wave radiation unit 102 from leaking outside.

The electromagnetic-wave detection unit 103 is arranged at a position facing the electromagnetic-wave radiation unit 102 across the conveyance unit 101. The electromagnetic-wave detection unit 103 includes a plurality of detection elements capable of detecting the electromagnetic waves applied by the electromagnetic-wave radiation unit 102 and detects an intensity distribution of the electromagnetic waves that reach the electromagnetic-wave detection unit 103 through the inspection region. Examples of the electromagnetic-wave detection unit 103 include a line sensor, an area sensor, a TDI (Time Delay Integration) sensor, or the like.

When an inspection target is present in the inspection region between the electromagnetic-wave radiation unit 102 and the electromagnetic-wave detection unit 103, the electromagnetic waves applied from the electromagnetic-wave radiation unit 102 are attenuated in accordance with the transmissivity of such electromagnetic waves at the respective positions on the inspection target and then reach the electromagnetic-wave detection unit 103, and the internal state of the inspection target is thereby observed as an intensity distribution of the electromagnetic waves detected by the electromagnetic-wave detection unit 103.

The image construction means 104 configures, as a two-dimensional image, the intensity distribution of the electromagnetic waves detected by the electromagnetic-wave detection unit 103, after having transmitted through the inspection target.

The memory unit 105 stores the data of the image of the inspection target, which is configured in the image construction means 104. The memory unit 105 is configured by memory devices, such as a RAM, a hard disk, or the like.

The cut-out means 106 retrieves the image of the inspection target, which is configured by the image construction means 104, from the memory unit 105, specifies an inspection area of the inspection target in the image by a predetermined method, cuts out the specified inspection area from the image, and outputs the same to the determination means 108 as a determination-target image. In addition, the cut-out means 106 may further include an extraction means 107 that extracts a smaller sub-image from the image of the inspection area, which is cut-out from the image of the inspection target, and outputs this sub-image to the determination means 108 as a determination-target image.

The determination-target images, which are either cut out in the cut-out means 106 or extracted in the extraction means 107, have the same size and shape as those of the learning-target images used to generate the learned model to be employed in the determination in the determination means 108.

Figure 3:
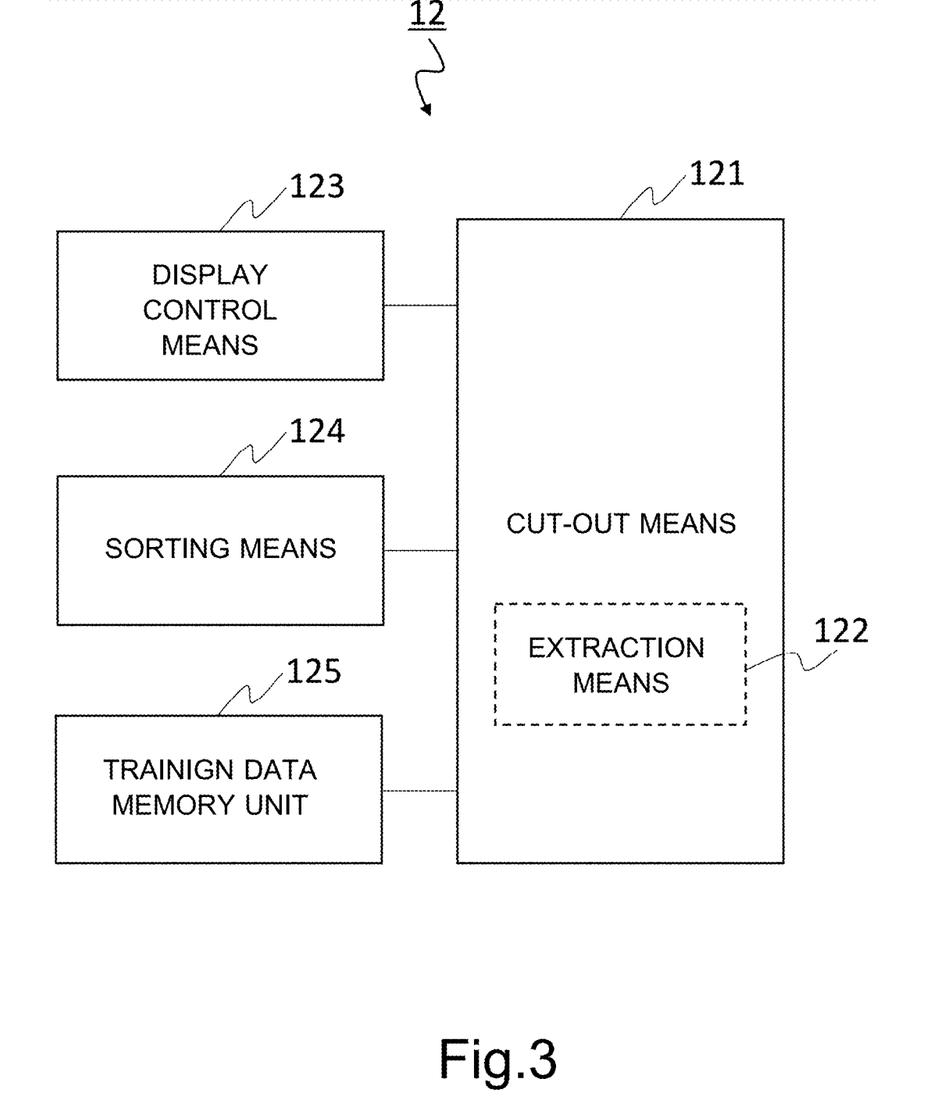
FIG. 3 is a block diagram showing a configuration of the training data generation unit 12.

The specific method for specifying the inspection area of the inspection target in the cut-out means 106 and the specific method for extracting the smaller sub-image in the extraction means 107 are the same, respectively, as the specification method in the cut-out means 121 and the extraction method in the extraction means 122 of the training data generation unit 12 described below, and the description thereof are therefore omitted here.

The determination means 108 performs inspection for determining whether the inspection target is normal (i.e. whether the inspection target is an object to be removed) on the basis of a determination result, which is output by inputting the determination-target image output from the cut-out means 106 into the learned model previously generated in the machine learning execution unit 13. The specific inspection method in the determination means 108 will be illustrated in the description of the operation of the inspection mode for the inspection device 1 described below.

It should be noted that, among the components of the inspection unit 10 described above, the image construction means 104, the cut-out means 106, the extraction means 107, and the determination means 108 may be configured as part of the control unit 11 described below.

The display 14 is a display device such as a liquid crystal display and displays an operation screen of the inspection device 1 and various images. The operation interface 15 is an input means such as a switch, a mouse, a keyboard, and the like, and receives an operation input made to the inspection device 1 by a user.

The control unit 11 controls the respective components of the inspection device 1. The control unit 11 is configured with a computer configured with, for example, a CPU, a memory element, and the like. The control unit 11 includes the training data generation unit 12 and the machine learning execution unit 13. The training-data generation unit 12 corresponds to the training data generation device of the present invention.

In the learning mode of the inspection device 1, the training data generation unit 12 generates training data to be used in machine learning implemented in the machine learning execution unit 13. FIG. 3 is a block diagram showing a configuration of the training data generation unit 12. As shown in FIG. 3, the training data generation unit 12 includes a cut-out means 121, a display control means 123, a sorting means 124, and a training data memory unit 125.

The cut-out means 121 receives an input of the image of the inspection target, specifies an inspection area of the inspection target in the image by a predetermined method, and cuts out the specified inspection area from the image.

The method for specifying the inspection area of the inspection target in the image of the inspection target is arbitrary. Examples of such method include a specification method based on reference points or a specification method through blob analysis.

In the specification method based on the reference points, the inspection area is specified based, for example, on positional information of one or more reference points input by an operator and information indicating the distance from the reference point(s). The method for inputting the positional information of the reference point(s) is arbitrary. For example, an operator may input a desired position to be set through the operation interface 15 while looking at the image of the inspection target displayed on the display 14.

The number of reference points to be set is arbitrary, but by setting them at each corner of the inspection area, it is possible to specify the inspection area reliably, even if the orientation of the inspection target 2 is different for each image. For example, if the inspection area is rectangular in shape, the inspection area can be specified reliably by setting four reference points.

Figure 4A:
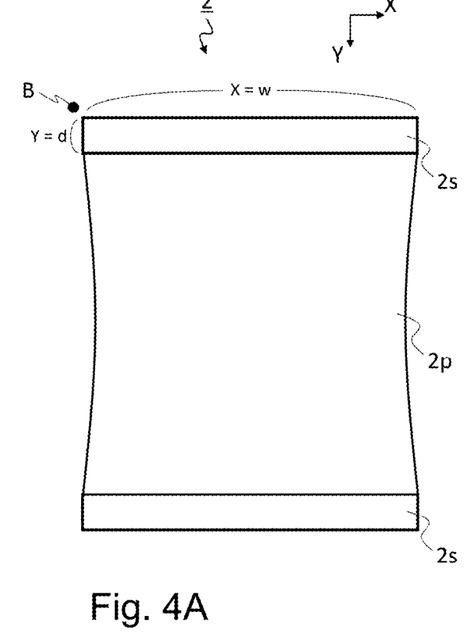
FIGS. 4A and 4B are diagrams showing one example of the method for specifying an inspection area on the basis of reference points.
Figure 4B:
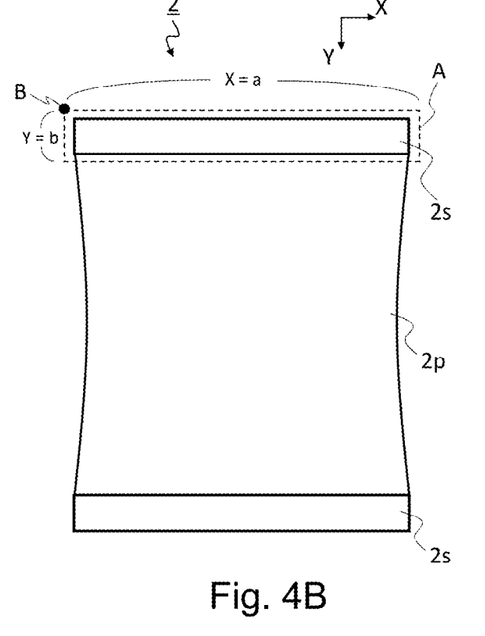

However, in the following cases, for example, it is sufficient to set one reference point. In general, when capturing images of a plurality of inspection targets 2 by the inspection unit 10, the inspection targets 2 are sequentially placed and fed to the conveyance unit 101 in substantially the same predetermined orientation and their images are captured therein. Therefore, for example, for an inspection target 2 with a storage section 2$p$ and seal sections 2$s$ (rectangles with w×d side length), each seal section provided at the top and bottom of the storage section, as shown in FIG. 4A, if the feeding direction is the X direction, the inspection targets 2 are placed on the conveyance unit 101 such that the longitudinal direction of the seal sections 2$s$ of the inspection targets 2 is the X direction and the lateral direction thereof is the Y direction, which is orthogonal to the X direction. In addition, the inspection area is defined as the area of a rectangle, one side of which extends in the X direction by length a (>w) and the other side of which extends in the Y direction by length b (>d) in the Y direction, both sides extending from a reference point. The lengths a and b may be preset as fixed values, or may be arbitrarily configurable by an operator input from the operation interface 15. As such, if the top seal section 2$s$ is to be specified as the inspection area, it is possible to specify the inspection area A as shown in FIG. 4B by setting the reference point B near the upper left corner of the seal section 2$s$.

The specification method through blob analysis specifies the inspection area by utilizing the fact that the position where the inspection target is present, the shape thereof, and/or the like can be detected as a blob by binarizing the image on the basis of the brightness/darkness of the image. Specifically, when the image is generated on the basis of the intensity of the electromagnetic-waves that have transmitted through the inspection target, the circumference around the section where the inspection target is present is much brighter than such section. Therefore, the position where the inspection target is present, the shape thereof, and/or the like can be detected as a blob on the basis of this brightness/darkness. Since which section of the inspection target is to be specified as the inspection area is known in advance, the inspection area of the inspection target can be specified in the image of the inspection target by checking the two against each other.

Figure 5A:
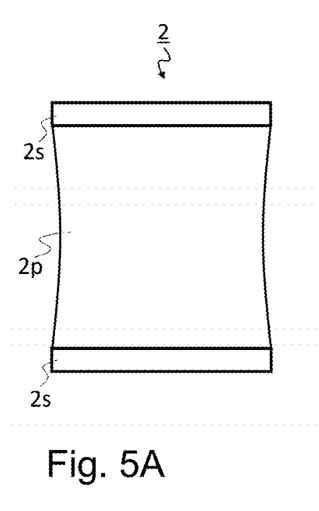
FIGS. 5A to 5C are diagrams showing one example of the method for specifying an inspection area on the basis of blob analysis.
Figure 5B:
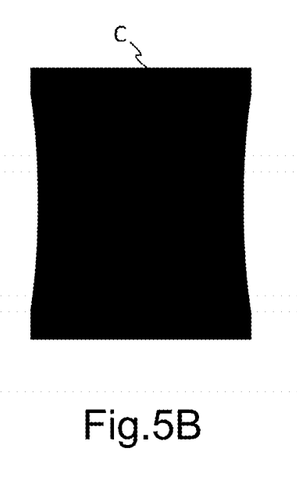
Figure 5C:
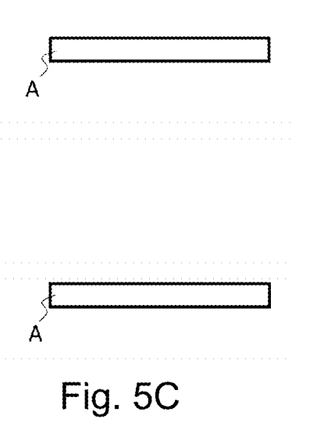

More specifically, for example, for an inspection target 2 with a storage section 2$p$ and seal sections 2$s$, each provided at the top and bottom of the storage section, as shown in FIG. 5A, if either or both of the top and bottom seal sections 2$s$ is/are to be specified as the inspection area(s), first, the position where the inspection target 2 is present and the shape thereof may be detected as blob C as shown in FIG. 5B by binarizing the image of the inspection target 2, which is generated by electromagnetic-wave radiation onto the inspection target 2, using, as a threshold, the darkness of the image corresponding to the section where the inspection target 2 is present. Then, since the position(s) where the seal section(s) 2$s$ to be specified as the inspection area(s) is/are present in the inspection target 2 is/are known in advance as shown in FIG. 5A, the position(s) where the seal section(s) 2$s$ is/are present (for example, an area(s) of a predetermined distance(s) from the respective top edge and bottom edge) in the image of the inspection target 2 can be specified as the inspection area(s) A as shown in FIG. 5C by checking the known-in-advance position(s) against the inspection target 2 whose position in the image is specified.

Figure 6A:
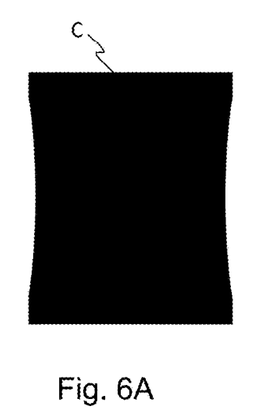
FIGS. 6A to 6C are diagrams showing another example of the method for specifying an inspection area on the basis of blob analysis.
Figure 6B:
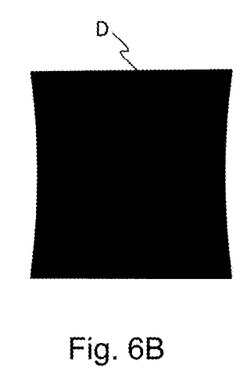
Figure 6C:
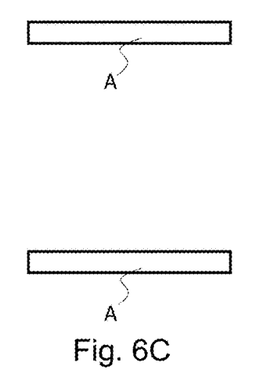

In addition, for example, for an inspection target 2 with a designed or patterned storage section 2$p$ and transparent seal sections 2$s$, the positions where the respective top and bottom seal sections 2$s$ are present may be specified as the inspection areas A as shown in FIG. 6C as follows: the position where the inspection target 2 is present and the shape thereof are detected as blob C as shown in FIG. 6A by binarizing the image of the inspection target 2 using, as a threshold, the darkness of the image corresponding to the section where the inspection target 2 including the seal sections 2$s$ is present; blob D indicating the storage section 2$p$ is detected by binarizing the image of the inspection target 2 using, as a threshold, the darkness of the image corresponding to the section where the storage section 2$p$ is present; and the difference between the two blobs is obtained.

Figure 7A:
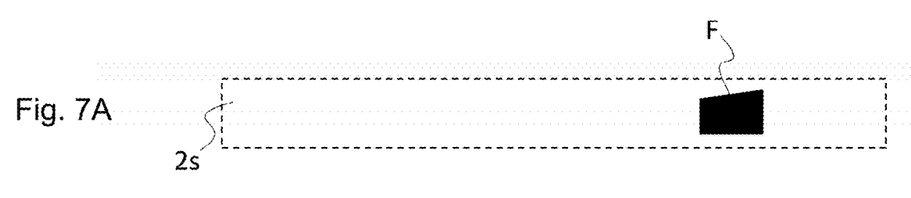
FIGS. 7A and 7B are diagrams showing a further example of the method for specifying an inspection area on the basis of blob analysis.
Figure 7B:
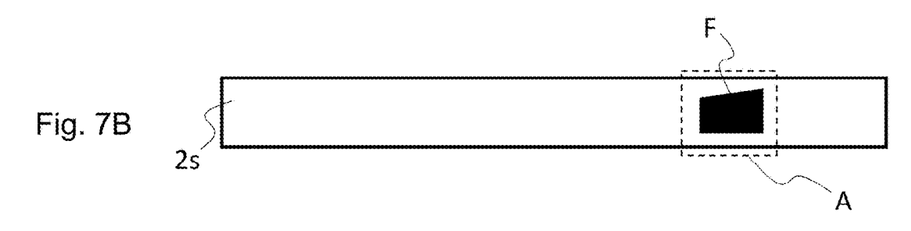

After the position(s) where the seal section(s) is/are present has/have been specified, blob F indicating the section where foreign matter is present may further be detected as shown in FIG. 7A by binarizing the image of the inspection target 2 by using, as a threshold, the darkness of the image corresponding to the section where the foreign matter is present in the seal section(s) 2$s$, and a predetermined area including this blob F may be specified as inspection area A as shown in FIG. 7B. FIGS. 7A and 7B illustrate the case with a single blob F, but it is possible to specify a plurality of inspection areas A in a similar manner in the case where there is a plurality of blobs F.

In the above-illustrated specification method through blob analysis, a plurality of inspection areas A may be specified simultaneously as described above. In such case, all of them may be specified as the inspection areas A or any part of them may be specified as the inspection area(s) A.

The cut-out means 121 cuts out the image of the inspection area(s) specified as described above from the image of the inspection target 2 and outputs the same as a learning-target image to the sorting means 124.

Figure 8A:
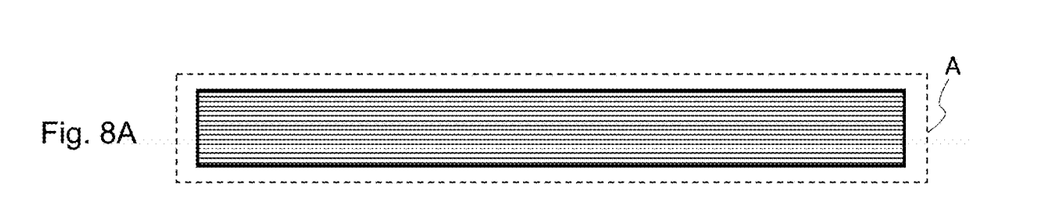
FIGS. 8A to 8C are diagrams showing one example of the method for extracting a sub-image with the extraction means 122.
Figure 8B:
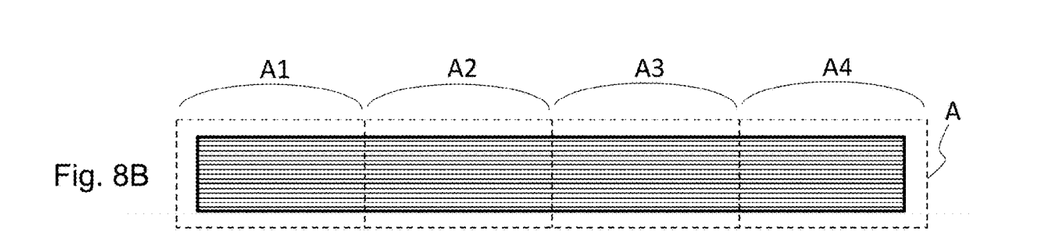

The cut-out means 121 may further include an extraction means 122 that extracts a smaller sub-image from the cut-out image of the inspection area(s) A. FIG. 8B shows an example of the case where the inspection area A specified as shown in FIG. 8A is subdivided into four sections A1, A2, A3, and A4, and the respective images of the four sections are extracted. The number of sections may be preset as fixed values, or may be arbitrarily configurable by an operator input from the operation interface 15.

The extraction means 122 outputs the thus extracted sub-images to the sorting means 124 as learning-target images.

In this way, by using the sub-images obtained by subdividing the inspection area A as the learning-target images, more learning data may be collected than in the case where the inspection area is not subdivided.

Figure 8C:
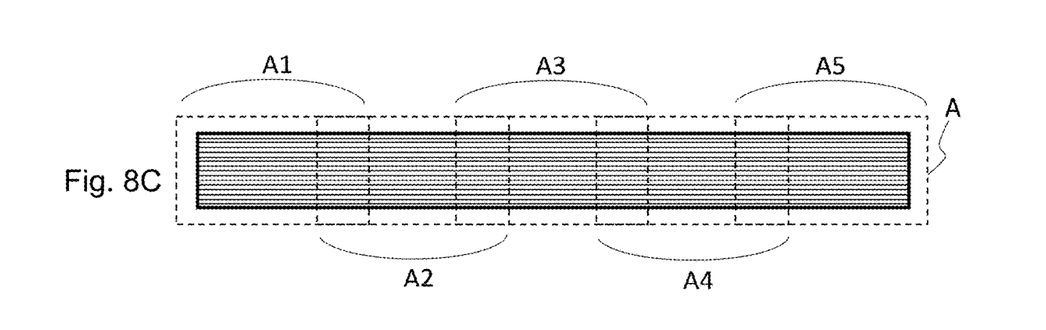

When extracting the sub-images, the extraction means 122 may extract them such that there is a partial overlap with a neighboring sub-images. FIG. 8C is an example of the case where, by using the same extraction width as that in the case of FIG. 8B, the sub-images are extracted such that there is an overlap by one fourth with a neighboring sub-image. In this case, the sub-images of each of the five sections A1, A2, A3, A4, and A5 may be extracted. The extent of overlap may be preset as fixed values, or may be arbitrarily configurable by an operator input from the operation interface 15.

In this way, by extracting the sub-images such that there is a partial overlap with a neighboring sub-image, more learning data may be collected than in the case where the sub-images are not overlapped with each other. In addition, in the case where the sub-images are not overlapped with each other, the learning data in the event of a biting or the like at the boundary of the respective sections will be incomplete. However, this may be prevented by making the sub-images overlap with each other. This also contributes to the collection of more learning data.

In the case where the cut-out means 121 cuts out a learning-target image when performing additional learning on the learned model, which is generated on the basis of the image of the inspection area, the cut-out conditions for the cut-out means 121 are set so that the image of the inspection area of the size and shape used to generate such learned model is cut out. In addition, in the case where the extraction means 122 cuts out a learning-target image when performing additional learning on the learned model, which is generated on the basis of the sub-image, the extraction conditions for the extraction means 122 are set so that the sub-image of the size and shape used to generate the learned model based on such sub-image is extracted.

Figure 9:
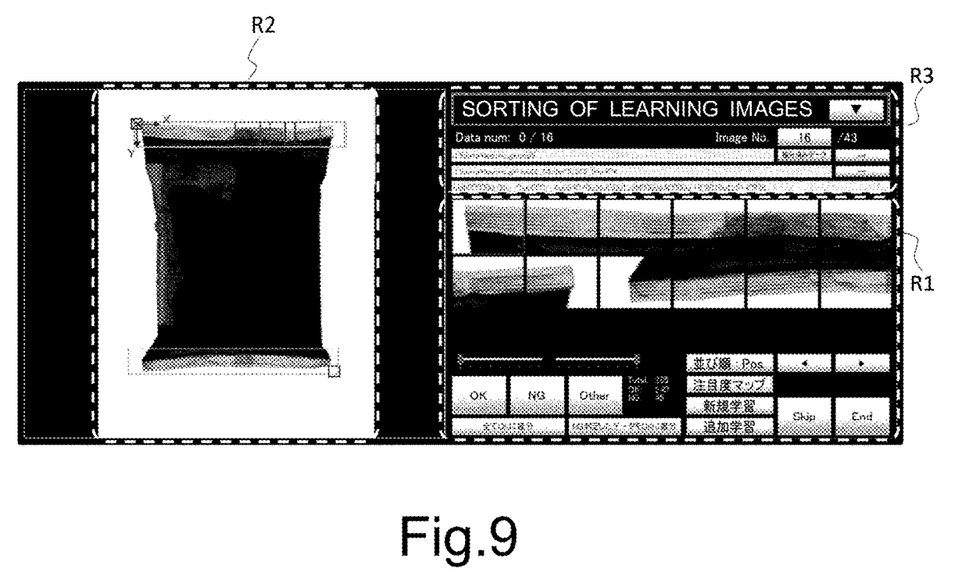
FIG. 9 is a diagram showing a display example of a learning target display screen.

The display control means 123 controls display on the display. The display control means 123 causes the display 14 to selectively display the learning-target images either cut out by the cut-out means 121 or extracted by the extraction means 122. FIG. 9 shows a display example of a learning target display screen when displaying the learning-target images on the display 14. The learning target display screen includes an input image display region R2, a learning-target image display region R1, and an information display region R3. In the learning-target image display region R1, the learning-target images are displayed side-by-side. In addition to the learning-target images, the learning-target image display region R1 displays a user interface for sorting the respective learning-target images in terms of pass/fail, and other interfaces. The input image display region R2 displays the image of the inspection target. The information display region R3 displays information related to the selected learning-target image (for example, the name of the image file, the location where the image file is stored, and the like).

When displaying the image of the inspection target in the input image display region R2, an indication indicating a region corresponding to the extracted learning-target image may be superimposed and displayed on the image of the inspection target. Such indication indicating the region corresponding to the learning-target image may be configured such that the user can select to display or hide the indication.

When displaying the learning-target images side-by-side in the learning-target image display region R1, the learning-target images may be sorted and displayed in the order of numerical values (scores) indicating the determination results obtained from the determinations made to the respective learning-target images with the existing learned model.

In addition, information indicating the determination results may be visibly displayed with respect to each learning-target image displayed side-by-side in the learning-target image display region R1. Specifically, a score, a determination result (normal/non-normal or the like), or the like, may be displayed at a position superimposed on or adjacent to each learning-target image. In addition, a display rendering may be applied to each learning-target image for indicating the determination result. For example, the learning-target images may be framed with different colors depending on whether the learning-target image is normal or non-normal.

One of the learning-target images displayed in the learning-target image display region R1 may be selected by clicking on that image. When a learning-target image is selected in the learning-target image display region R1, the selected learning-target image is framed and displayed in the learning-target image display region R1, and the inspection area or sub-region corresponding to the selected learning-target image is displayed in the input image display region R2 in such a manner that such inspection area or sub-region can be distinguished from the other inspection areas or sub-regions (such as, by being indicated in double-framing).

Conversely to the above, one of the inspection areas or sub-regions corresponding to the learning-target images displayed in the input image display region R2 may be clicked on and the learning-target image corresponding to such inspection area or sub-region may be selected. In this way, when the clicking is performed in the input image display region R2, the learning-target image corresponding to the selected inspection area or sub-region is framed and displayed in the learning-target image display region R1, and the selected inspection area or sub-region is displayed in the input image display region R2 in such a manner that such inspection area or sub-region can be distinguished from the other inspection areas or sub-regions (such as, by being indicated in double-framing). By displaying the image of the inspection target and the selected learning-target image in association with each other, it is possible to understand, at a glance, how the selected learning-target image is captured in the image of the inspection target.

In addition, when a learning-target image is selected, the section corresponding to the selected learning-target image may be enlarged and displayed in the input image display region R2. In this way, the section corresponding to the focused learning-target image may be easily checked in detail. Further, a score, a determination result (normal/non-normal or the like), or the like, for the selected learning-target image may be displayed in the information display region R3.

The sorting means 124 sorts the extracted learning-target images into one of predetermined categories (such as whether the extracted learning-target image is normal or non-normal) on the basis of the user's visual checking.

When the user performs the operation of sorting the learning-target image into one of the predetermined categories, the sorting means 124 sorts such learning-target image into one of the categories according to the user's operation, and training data, wherein the learning-target image and the category into which it is sorted are associated with each other, is stored in the training data memory unit 125.

The operation of sorting the learning-target images into one of the predetermined categories is performed as follows: for example, in the case of sorting the learning-target images depending on whether they are normal or non-normal, the user selects a learning-target image by operating the operation interface 15, while looking at the display 14; the user visually determines whether the selected learning-target image is normal or non-normal; and if the image is normal, a PASS button is clicked and if the image is non-normal, a FAIL button is clicked. Instead of the user selecting the learning-target image through the user's operation, the learning-target images may be sequentially sorted in the order automatically determined by the sorting means 124.

The way of categorizing the learning-target images includes simply sorting the learning-target images into two categories, i.e., whether the learning-target image is normal or non-normal regarding any one of determination items, such as biting of the contents, wrinkles of the seal, folds of the seal, or the like. In addition thereto, sorting may be employed, in which, for example, the user visually determines whether a learning-target image is normal regarding each of a plurality of determination items, such as biting of the contents, wrinkles of the seal, folds of the seal, and the like, and the learning-target images are sorted into a plurality of categories, each of which consists of a combination of determination results of the plurality of determination items. For example, if there are three determination items, since there are two types of determination results (i.e., normal and non-normal) for each item, the sorting is made into any one of eight (which is two cubed) categories. In this way, such categorization enables the learning-target images to be used for generation of learned models, which are categorizable according to combinations of normal and/or non-normal determination results of the respective determination items, and/or for additional learning of such learned models.

In addition, sorting may be employed in which, for each learning-target image, the user visually determines whether it is normal regarding each of the plurality of determination items, and the learning-target images are sorted into two categories, i.e., whether it is normal or non-normal, for each determination item. In other words, rather than sorting one learning-target image into one of the categories, it is categorized as either normal or non-normal for each determination item. In this way, such categorization enables the learning-target images to be used for generation of learned models, which can individually determine whether a learning-target image is normal or non-normal for the respective determination items, and/or for additional learning of such learned models, and/or the like.

Which categorization is selected in the sorting means 124 depends on what type of determination results is desired. The reason for this is that the categorization in the sorting means 124 will be reflected in the determination result (i.e., the categorization result), which is output, with respect to the input of a determination-target image, by the learned model generated on the basis of the learning-target images in the machine learning execution unit 13. In addition, in the case of performing additional learning on a previously generated learned model, it depends on which categorization such learned model is generated to output the determination result with.

Data in which the learning-target images and the categories, into which such learning-target images are sorted by the sorting means 124, are associated with each other is stored in the training data memory unit 125 as training data. Further, training data generated by external devices may also be stored in the training data memory unit 125.

The training data memory unit 125 is configured with a memory device, such as a RAM, a hard disk, or the like. The training data memory unit 125 may also serve as the memory unit 105 in the inspection unit 10. In addition, a memory media provided to the inspection device 1 for storing various types of information may be used such that it may be shared.

The data in which the learning-target images and the categories, into which such learning-target images are sorted by the sorting means 124, are associated with each other may be stored, as the training data, in the training data memory unit 125 in any manner, as long as the training data is stored such that into which category the sorting is made is distinguishable, such as whether each learning-target image is normal or non-normal, which combination of the determination results of the plurality of determination items, and/or the like. For example, each learning-target image may be stored in each of folders organized by categories into which the images are sorted. Alternatively, information indicating the categories into which the images are sorted may be embedded in files as a file name and/or additional information of the learning-target images.

The cut-out conditions in the cut-out means 121 and the extraction conditions in the extraction means 122 for the learning-target images configuring the training data may further be stored in the training data memory unit 125 in association with the training data.

By executing a learning program, the machine learning execution unit 13 generates a new learned model by applying additional machine learning to the existing learned model using the training data read from the training data memory unit 125, i.e., the learning-target images with the category information. Alternatively, a new learned model may be generated by performing new machine learning using the training data read from the training data memory unit 125. In the case of generating a new learned model, machine learning may be performed on a preliminarily prepared initial (i.e., yet-to-be learned) model.

The "machine learning" referred to herein conveys the meaning of repeatedly performing processing with input of predetermined data on an initial model or a model that has already been applied with certain learning in order to approach toward the target learned model. Specifically, for example, parameters such as weights and/or bias may be adjusted to ensure that the correct answer will be output by inputting the training data into a neural network model.

In addition, the "learned model" referred to in the present invention is a model that has learned to output a predetermined determination result, for example, a score (numerical value, etc.) indicating normality, more specifically, for example, a score indicating the possibility of being non-normal, by receiving the input of an image of an inspection area of an inspection target and/or a sub-image thereof.

The specific technique of machine learning in the machine learning execution unit 13 is arbitrary, and, for example, a deep learning method using a convolutional neural network model may be employed.

Hereinafter, the operation of the inspection device 1 configured as described above will be described regarding both the learning mode and the inspection mode.

Operation in Learning Mode

Figure 10:
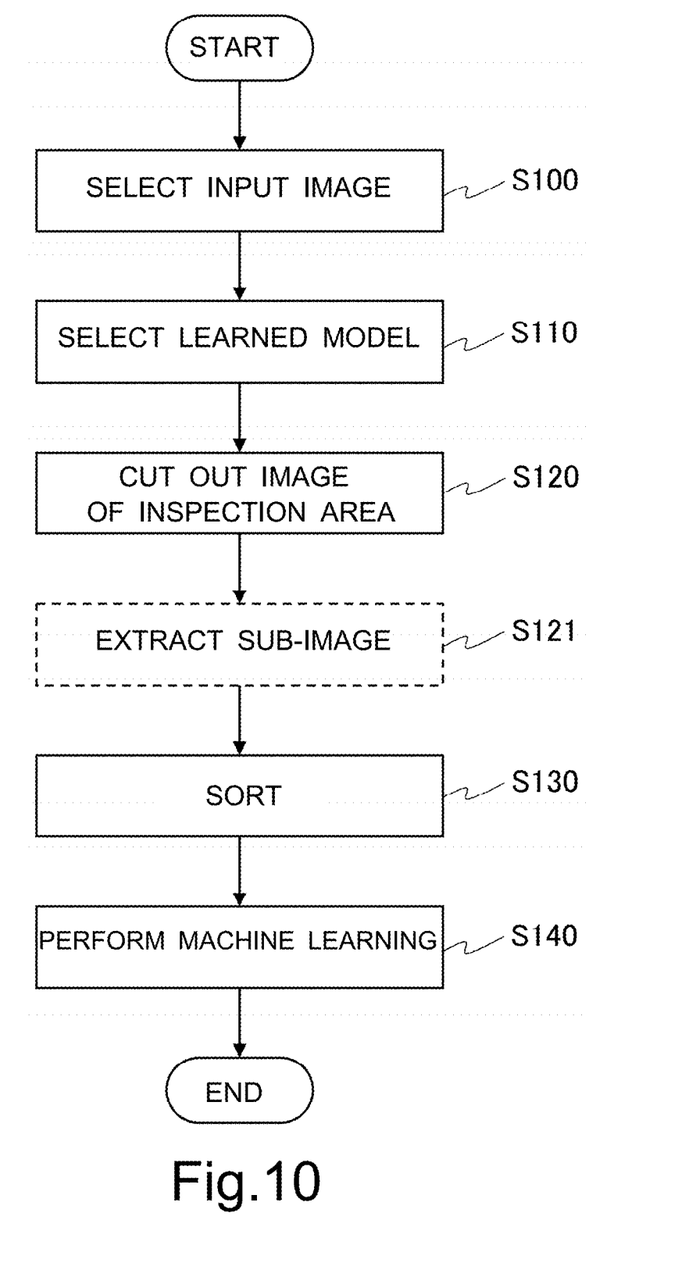
FIG. 10 is a flowchart illustrating the operational procedure of the inspection device 1 in the learning mode.

FIG. 10 is a flowchart illustrating the operational procedure of the inspection device 1 in the learning mode. The learning mode starts by selecting the learning mode on the operation interface 15 of the inspection device 1. When the learning mode starts, an operation screen for the learning mode is displayed on the display 14. The user can generate the training data and perform machine learning on the learned model by operating the operation screen for the learning mode in accordance with the following procedure.

First, the training data generation unit 12 receives an operation by the user for selecting an input image (step S100). The input image may be an image of an inspection target, which is actually captured in the inspection unit 10, or an image of the inspection target, which is separately prepared for learning. Subsequently, the training data generation unit 12 receives an operation by the user for selecting a learned model (step S110). Additional learning in the machine learning in the later stage will be performed on this learned model selected here. Step S110 may be omitted if a learned model is to be newly generated.

Subsequently, in the cut-out means 121, the training data generation unit 12 sets a reference point in the image of the inspection target, receives the input of the length of each side originating from the reference point for specifying the inspection area, and cuts out the image of the specified inspection area on the basis of the received cut-out conditions (step S120). In addition, in the case of subdividing the cut-out image of the inspection area to extract sub-images, the input of the number of subdivisions and the extent of overlap is received and each sub-image is extracted on the basis of the received extraction conditions in the extraction means 122 (step S121).

Specifically, in steps S120 and S121, the cut-out conditions and extraction conditions are set by inputting the desired values in the items displayed on the operation screen. When the settings for the conditions are finalized, the cut-out means 121 cuts out the image of the inspection area and the extraction means 122 extracts the sub-images, according to the setting content. The image of the inspection area or sub-images, which are learning-target images obtained as a result of the processing, are stored in folders for learning-target images, which are not yet sorted into categories.

Subsequently, in the sorting means 124, the training data generation unit 12 receives an operation for selecting the sorting of each of the learning-target images into any of the categories and stores, as the training data, the learning-target images and determination results in association with each other on the basis of the selection in the training data memory unit 125 (step S130).

Subsequent to step S130, the machine learning execution unit 13 receives an instruction for executing machine learning on the basis of the training data generated in step S130 and executes the learning program according to the instruction to perform machine learning on the learned model (step S140). At this time, the machine learning execution unit 13 displays, on the operation screen, an interface for allowing the user to select whether to perform additional machine learning on the existing learned model or whether to newly generate a learned model. If the additional machine learning is to be performed on the existing learned model, the user may be presented with a menu for selecting a learned model. However, the selection of a learned model in this step may be omitted, and the machine learning may instead be performed on the learned model selected in step S110. When the machine learning ends in step S140, the sequence of processing in the learning mode is then completed.

Operation in Inspection Mode

Figure 11:
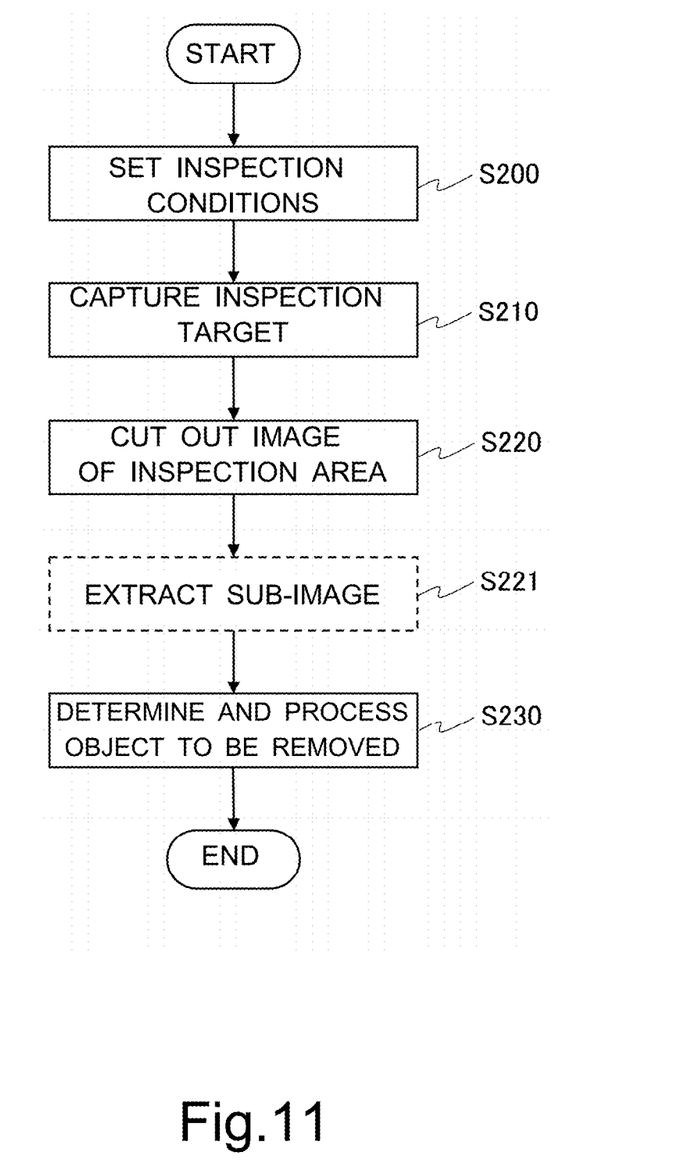
FIG. 11 is a flowchart illustrating the operational procedure of the inspection device 1 in the inspection mode.

FIG. 11 is a flowchart illustrating the operational procedure of the inspection device 1 in the inspection mode. The inspection mode starts by selecting the inspection mode on the operation interface 15 of the inspection device 1. When the inspection mode starts, an operation screen for the inspection mode is displayed on the display 14. The user can inspect an inspection target by operating the operation screen for the inspection mode in accordance with the following procedure.

First, the inspection device 1 receives an operation by the user for setting the inspection conditions (step S200). The inspection conditions include selection of a learned model to be used in the determination of an object to be removed, in addition to conditions for a general inspection device, such as an irradiation intensity of X-rays, visible light, etc. at the time of image capturing, time of exposure, a feeding speed, etc.

When the setting of the inspection conditions is completed, the inspection unit 10 starts inspecting the inspection targets according to predetermined operations by the user. The inspection unit 10 first feeds the inspection target to the image-capturing position to perform the image capturing (step S210).

Subsequently, the inspection unit 10 cuts out an image of an inspection area from the captured image of the inspection target in the cut-out means 106 (step S220) or further extracts a sub-image from the image of the inspection area cut out in the cut-out means 106 in the extraction means 107 (step S221) in order to generate a determination-target image. The number of images of the inspection areas to be cut out and the number of sub-images to be extracted, both as determination-target images, are arbitrary. The determination-target images to be cut out or extracted have the same size and shape as those of the learning-target images used to generate the learned model to be employed in the determination.

Subsequently, in the determination means 108, the inspection unit 10 performs inspection for determining whether the inspection target is normal (i.e., whether the inspection target is an object to be removed) on the basis of a determination result, which is output by inputting the determination-target images output from the cut-out means 106 or the extraction means 107 into the learned model (step S230).

In the determination means 108, the determination-target images are first input into the learned model, and the learned model outputs a score (such as a numerical value) indicating, for example, normality as the determination results. In the case where there are a plurality of images of the inspection area cut out as determination-target images and a plurality of sub-images extracted as determination-target images, the respective learning-target images are input into the learned model and the respective determination results are obtained.

As an example, the case in which the learned model outputs a numerical value will be described hereinafter. In the case of outputting numerical values, the range of numerical values to be output is set arbitrarily, and for example, a numerical value in a range between 0 and 1 may be output. In this case, the numerical value increments in the numerical value range are arbitrary. For example, if 0.01 increments are used, the numerical values such as 0.12, 0.81, and the like, may be output. The output numerical values may be displayed on the display 14 or output to any output means, such as a printer or memory medium.

In the case where a learned model is caused to learn using the learning-target images that are categorized into two categories (for example, normal or non-normal), the learned model outputs, for example, a numerical value closer to 1 for a higher possibility of being non-normal, assuming 0 represents normal.

On the other hand, in the case where a learned model is caused to learn using the learning-target images that are categorized into three or more categories (for example, normal and multiple non-normal cases), the learned model outputs, for example, a numerical value of each category such that a proportion value to 1 is larger for a category with a higher possibility, assuming that the sum of the numerical values of all of the categories is set to have the numerical value 1. For example, when the numerical value is 0.2 for category 1, 0.4 for category 2, 0.3 for category 3, and 0.1 for category 4, it is most likely that a determination-target image falls under category 2.

Subsequently, the determination means 108 determines whether the inspection target is an object to be removed on the basis of the numerical value output from the learned model. The determination may be made using only one determination-target image or a plurality of determination-target images.

First, a determination example in which a single determination-target image is used in the determination will be described.

In the case of two categories, for example, by assuming that 0 represents normal, a numerical value closer to 1 is output when there is a higher possibility of being non-normal with respect to the input of a determination-target image. In such case, by assuming that any numerical value between 0 and 1 represents a threshold, when the numerical value is equal to or more than the threshold, the determination-target image is considered to be non-normal and thus, the inspection target is determined to be an object to be removed.

On the other hand, in the case of three categories, for example, by assuming that the sum of the numerical values of all of the categories is set to have the numerical value 1, a numerical value of each category is output such that a proportion value to 1 is larger for a category with a higher possibility with respect to the input of a determination-target image. In such case, a plurality of determination methods is possible, any determination method may be employed therefrom. For example, when the numerical value is 0.2 for category 1, 0.4 for category 2, 0.3 for category 3, and 0.1 for category 4, and when category 2 indicates normal and the other categories indicate non-normal, category 2, which indicates normal, has the highest possibility when seen based on these categories. Based on this, the inspection target is determined to not be an object to be removed. However, in terms of the category indicating normal and the category indicating non-normal, the numerical value of category 2 that indicates normal is 0.4, while the sum of the numerical values of the other categories that indicate non-normal is 0.6. From this perspective, there is therefore a higher possibility of being non-normal. Based on this, the inspection target is determined to be an object to be removed.

Next, a determination example in which a plurality of determination-target images is used in the determination will be described. In the case of two categories, for example, by assuming that 0 represents normal, a numerical value closer to 1 is output when there is a higher possibility of being non-normal with respect to the input of a determination-target images. In such case, first, by assuming that any numerical value between 0 and 1 represents a threshold, each determination-target image is determined to be either normal or non-normal based on the threshold. Then, if, for example, there is more than a predetermined number of non-normal determination-target images out of the plurality of determination-target images, the inspection target is determined to be an object to be removed. In this case, a comparison to a predetermined number may be performed after all of the determination-target images are determined as to whether they are normal or non-normal, or the number of non-normal determination-target images may be counted and the inspection target may be determined to be an object to be removed when a predetermined number is reached. In addition, an immediate determination threshold may be provided, which is another threshold further closer to 1 than the threshold for determining normal or non-normal. If there is even one determination-target image for which the immediate determination threshold has been exceeded, the inspection target may be determined to be an object to be removed at that point.

On the other hand, in the case of three categories, for example, by assuming that the sum of the numerical values of all of the categories is set to have the numerical value 1, a numerical value of each category is output such that a proportion value to 1 is larger for a category with a higher possibility with respect to the input of a determination-target images. In such case, first, each determination-target image is determined to be either normal or non-normal using the previously-illustrated method for determining non-normality (an object to be removed) in the case of a single determination-target image and three categories. Then, the determination as to objects to be removed may be performed using the previously-illustrated method for determining the object to be removed in the case of a plurality of determination-target images and two categories.

In the case of determining whether an inspection target is an object to be removed using a plurality of determination-target images, the way of selecting such plurality of determination-target images is arbitrary. For example, images of two inspection areas A, which are respectively specified for the top seal section 2s and the bottom seal section 2s in the image of the inspection target 2 as shown in FIG. 5B, may be cut out, and these two images may be used as determination-target images. In addition, a total of 2n sub-images obtained by further subdividing each of the top and bottom inspection areas A by n (where n is an integer larger than or equal to 2), may be used as the determination-target images. Further, two sub-images may be extracted by extracting one sub-image from each of the top sub-images obtained by being divided by n and the bottom sub-images obtained by being divided by n, and such two sub-images may be used as the determination-target images.

Finally, the determination means 108 performs the necessary processing on the inspection targets determined as objects to be removed based on the above-described determination processing. Here, the necessary processing may include, for example, displaying of graphics (for example, a frame) on the display 14 for indicating an object to be removed along with the captured image, removal of the object to be removed, sorting between the object to be removed and the normal product, and the like. This completes the inspection of a batch of inspection targets. In the case where the inspection targets are fed into the inspection device 1 sequentially, the inspection device 1 inspects the inspection targets sequentially by repeating the above-described sequence of steps.

The above-described configuration enables the inspection device 1 to rapidly generate a large amount of training data to be input into the learning program in the learning mode and to generate a learned model by performing machine learning using the generated training data as the input. In the inspection mode, the inspection device 1 is enabled to perform high-precision inspection using the learned model generated in the learning mode.

Variation of Embodiments

The embodiments of the present invention have been described above; however, the present invention is not limited to these examples.

For example, in the above-described embodiments, the training data generation unit 12 and the machine learning execution unit 13 are incorporated in the inspection device 1; however, the training data generation unit 12 and the machine learning execution unit 13 may not need to be incorporated in the inspection device 1 and may instead be provided as a separate training data generation device or a learned model generation device. For example, the training data generation unit 12 and the machine learning execution unit 13 may be implemented by causing a computer to execute a computer program to function as the above-described training data generation unit 12 and machine learning execution unit 13.

It should be noted that embodiments obtained by those skilled in the art appropriately performing addition, deletion and/or design change of components on the above-described respective embodiments and embodiments obtained by those skilled in the art appropriately combining the features of the respective embodiments are also encompassed in the scope of the present invention, provided that they include the gist of the present invention.

The invention claimed is:

1. An inspection device, comprising:
   a conveyor belt for feeding an inspection target to cause the inspection target to pass through an inspection region;
   an electromagnetic-wave radiation unit for applying, as electromagnetic waves, X-rays to the inspection region;
   an electromagnetic-wave detection sensor arranged at a position facing the electromagnetic-wave radiator across the conveyor belt and configured to detect the electromagnetic waves that have transmitted through the inspection target passing through the inspection region; and
   a processor configured to
     configure, as a two-dimensional image, an intensity distribution of the electromagnetic waves detected by the electromagnetic-wave detection sensor,
     specify an inspection area of the inspection target in the two-dimensional image by a predetermined method,
     cut out the specified inspection area from the two-dimensional image,
     extract a sub-image from the cut-out two-dimensional image of the specified inspection area, the sub-image being smaller than the cut-out two-dimensional image of the specified inspection area, and
     perform an inspection for determining whether the inspection target is normal based on a determination result that is output by inputting, as a determination-target image, the sub-image into a learned model, wherein
   the processor is configured to extract, from the cut-out two-dimensional image of the specified inspection area, a plurality of sub-images including the sub-image such that neighboring sub-images among the plurality of sub-images partially overlap each other.

2. The inspection device according to claim 1, wherein the predetermined method for specifying the inspection area is a method for specification based on
   positional information of one or more input reference points, and
   information indicating a distance from the one or more input reference points.

3. The inspection device according to claim 1, wherein the predetermined method for specifying the inspection area is a method for specification based on a blob detected by binarizing the two-dimensional image based on a predetermined threshold of brightness/darkness of the two-dimensional image.

4. The inspection device according to claim 1, wherein the determination result output by the learned model is a score that indicates normality of the input determination-target image, and
   the processor is configured to perform the inspection for determining whether the inspection target is normal based on the score.

5. The inspection device according to claim 4, wherein a plurality of determination-target images including the determination-target image is provided, wherein
   the processor is configured to perform the inspection for determining whether the inspection target is normal based on the score output by the learned model in response to each of the plurality of determination-target images input into the learned model.

* * * * *